US009580516B2

(12) United States Patent
Narita

(10) Patent No.: US 9,580,516 B2
(45) Date of Patent: Feb. 28, 2017

(54) METHODS FOR PRODUCING ALKALI CELLULOSE AND CELLULOSE ETHER

(75) Inventor: Mitsuo Narita, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 607 days.

(21) Appl. No.: 13/398,369

(22) Filed: Feb. 16, 2012

(65) Prior Publication Data

US 2012/0214984 A1   Aug. 23, 2012

(30) Foreign Application Priority Data

Feb. 21, 2011  (JP) .................. 2011-034470

(51) Int. Cl.
| C08B 1/08 | (2006.01) |
| C08B 11/02 | (2006.01) |
| C08B 1/06 | (2006.01) |
| C08B 11/00 | (2006.01) |
| C08B 11/193 | (2006.01) |

(52) U.S. Cl.
CPC ............. C08B 1/08 (2013.01); C08B 11/00 (2013.01); C08B 11/193 (2013.01)

(58) Field of Classification Search
CPC .............. C08B 1/08; C08B 1/06; C08B 11/02
USPC ............................ 536/124, 61, 85
See application file for complete search history.

(56) References Cited

U.S. PATENT DOCUMENTS

| 2,054,299 A | 9/1936 | Richter |
| 2,138,014 A | 11/1938 | Richter |
| 2,469,764 A | 5/1949 | Erickson |
| 3,943,233 A | 3/1976 | Swanson et al. |
| 4,117,223 A | 9/1978 | Lodige et al. |
| 4,310,663 A | 1/1982 | Hilbig et al. |
| 4,316,982 A | 2/1982 | Holst et al. |
| 4,363,784 A | 12/1982 | Hilbig et al. |
| 4,410,693 A | 10/1983 | Gibson et al. |
| 4,508,895 A | 4/1985 | Balser |
| 4,612,345 A | 9/1986 | Hess |
| 8,017,766 B2 | 9/2011 | Narita et al. |
| 8,496,782 B2 | 7/2013 | Narita |
| 2007/0144692 A1 | 6/2007 | Narita et al. |
| 2007/0149771 A1 | 6/2007 | Narita et al. |
| 2007/0149772 A1 | 6/2007 | Narita et al. |
| 2007/0149773 A1 | 6/2007 | Narita et al. |
| 2007/0149774 A1 | 6/2007 | Narita et al. |
| 2008/0003429 A1 | 1/2008 | Luo et al. |
| 2009/0071377 A1 | 3/2009 | Wohrmeyer et al. |
| 2009/0165971 A1 | 7/2009 | Narita |
| 2009/0165972 A1 | 7/2009 | Narita |

FOREIGN PATENT DOCUMENTS

| CN | 1990507 A | 7/2007 |
| CN | 101096431 A | 1/2008 |
| EP | 1 734 055 A2 | 12/2006 |
| EP | 1 803 736 A1 | 7/2007 |
| EP | 1 803 737 A1 | 7/2007 |
| EP | 1 803 738 A1 | 7/2007 |
| EP | 1 803 739 A1 | 7/2007 |
| EP | 1803739 A1 * | 7/2007 |
| EP | 1 873 302 A2 | 1/2008 |
| EP | 1 878 752 A1 | 1/2008 |
| JP | 126608 | 6/1938 |
| JP | 126608 B | 6/1938 |
| JP | 35-8347 B | 7/1960 |
| JP | 36-17641 B | 9/1961 |
| JP | 47-003964 B | 2/1972 |
| JP | 47-003965 B | 2/1972 |
| JP | 48-019232 B | 6/1973 |
| JP | 48-026385 B | 8/1973 |
| JP | 53-041356 A | 4/1978 |
| JP | 55-145701 A | 11/1980 |
| JP | 56-002302 A | 1/1981 |
| JP | 3073562 B | 11/1983 |
| JP | 59-056401 A | 3/1984 |
| JP | 60 040101 A | 3/1985 |
| JP | 61-264001 A | 11/1986 |
| JP | 64-085201 A | 3/1989 |
| JP | 10-158302 A | 6/1998 |
| JP | 10-279601 A | 10/1998 |
| JP | 2000-506215 A | 5/2000 |
| JP | 2001-002701 A | 1/2001 |
| JP | 2001-302701 A | 10/2001 |
| JP | 2003-171401 A | 6/2003 |
| JP | 2003-183301 A | 7/2003 |
| JP | 2005-008827 A | 1/2005 |
| JP | 36-17641 B | 2/2005 |
| JP | 2005-239845 A | 9/2005 |
| JP | 2006-348177 A | 12/2006 |
| JP | 2007-197677 A | 8/2007 |
| JP | 2007-197678 A | 8/2007 |
| JP | 2007-197679 A | 8/2007 |
| JP | 2007-197680 A | 8/2007 |
| JP | 2007-197681 A | 8/2007 |
| JP | 2007-197682 A | 8/2007 |
| JP | 4087534 B2 | 2/2008 |
| JP | 2009-155534 A | 7/2009 |
| JP | 2009-173907 A | 8/2009 |
| JP | 2009-528972 A | 8/2009 |
| WO | WO 2007/023513 A1 | 3/2007 |

OTHER PUBLICATIONS

Michie, R.I.C., et al., Kinetic Study of the Autoxidation of Cellulose Suspended in Sodium Hydroxide Solution; Journal of Polymer Science; Part A; vol. 2; 1964; pp. 2063-2083.

(Continued)

*Primary Examiner* — Sudhakar Katakam
*Assistant Examiner* — Everett White
(74) *Attorney, Agent, or Firm* — Alston & Bird LLP

(57) ABSTRACT

When a combination of pulps having different alkali metal hydroxide solution absorption rates is as a raw material, contact conditions such as a contact temperature and a contact time have to be changed frequently, depending on the absorption rate of pulps currently processed, thereby causing a problem of reduced productivity. For solving the problem, provided is a method for producing alkali cellulose, comprising at least the steps of: bringing two or more types of pulps having different alkali metal hydroxide solution absorption rates into contact with an alkali metal hydroxide solution to obtain a contact product; and draining the contact product, wherein the highest absorption rate is not more than 4.0 times as fast as the lowest absorption rate.

2 Claims, 1 Drawing Sheet

(56) References Cited

OTHER PUBLICATIONS

Partial Translation of "Cellulose No Jiten (Encyclopedia of Cellulose)", edited by the Cellulose Society of Japan and published on Nov. 10, 2000, 3 pages.
European Search Report for Application No. 12156044.5 dated Jun. 26, 2012.
European Search Report for Application No. 12156043.7 dated Jun. 22, 2012.
European Search Report for Application No. 12156045.2 dated Jun. 18, 2012.
Extended European Search Report from European Application No. 12156046.0, dated Jun. 8, 2012.
Office Action for Japanese Application No. 2011-034469 dated May 8, 2013.
Office Action for Japanese Application No. 2011-034471 dated May 8, 2013.
Extended Search Report for Application No. EP 12 15 6041.1 dated Jun. 29, 2012.
Office Action for Chinese Application No. 201210038976.9 dated Dec. 4, 2013.
Office Action for Japanese Application No. 2012-034021 dated Oct. 21, 2014.
Office Action from Japanese Application No. 2011-034472, dated Jul. 8, 2014.
Office Action from Japanese Application No. 2011-034468, dated Jul. 8, 2014.
Office Action from U.S. Appl. No. 13/398,247 dated Sep. 4, 2014.
Office Action from U.S. Appl. No. 13/398,273 dated Aug. 28, 2014.
Office Action from U.S. Appl. No. 13/398,317 dated Aug. 28, 2014.
Office Action from U.S. Appl. No. 13/398,393 dated Sep. 11, 2014.
Office Action for U.S. Appl. No. 13/398,247 dated Mar. 24, 2015.
Office Action for U.S. Appl. No. 13/398,273 dated Apr. 10, 2015.
Notice of Allowance for U.S. Appl. No. 13/398,317 dated Apr. 23, 2015.
Office Action for U.S. Appl. No. 13/398,393 dated Apr. 23, 2015.

* cited by examiner

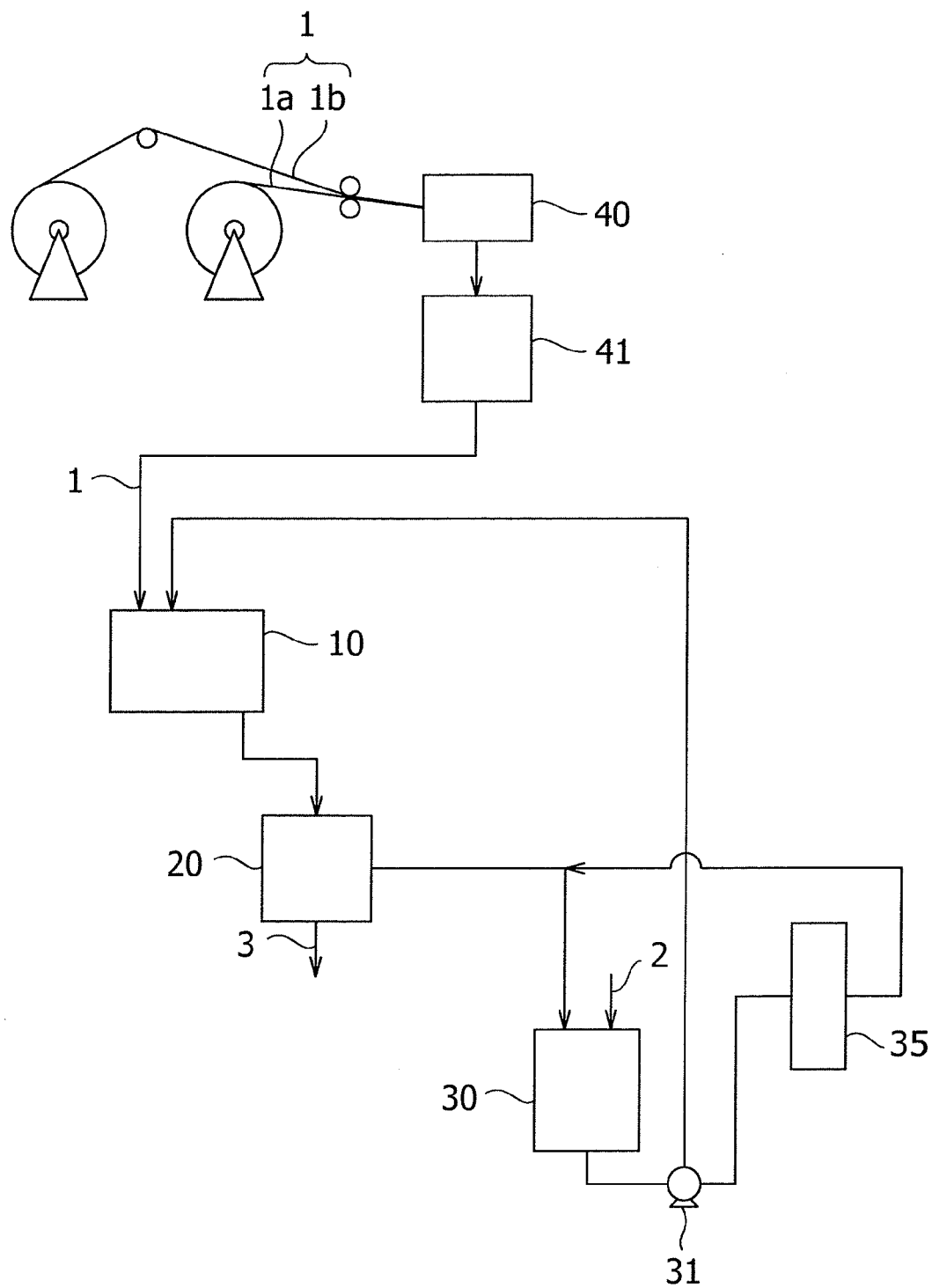

METHODS FOR PRODUCING ALKALI CELLULOSE AND CELLULOSE ETHER

BACKGROUND OF THE INVENTION

1. Field of the Invention

The present invention relates to a method for producing alkali cellulose and a method for producing cellulose ether by using the alkali cellulose.

2. Description of the Related Art

For the preparation of cellulose ether, known is a method of bringing an alkali solution into contact with a highly purified pulp to prepare the corresponding alkali cellulose, and etherifying the resulting alkali cellulose with an etherifying agent. The cellulose ether obtained as a final product becomes water-soluble by properly controlling its degree of substitution. The water-soluble cellulose ether contains a water-insoluble portion which sometimes lowers the light transmittance of the aqueous solution of the cellulose ether or damages the commodity value of the cellulose ether as a contaminant. This insoluble portion appears to be caused by the presence of a low-substituted portion which does not have enough substituents to dissolve in water. One of the reasons why the insoluble portion is present is that an alkali distribution is uneven in the alkali cellulose.

Functions of this alkali include swelling the cellulose therewith to change its crystal structure in the pulp and thereby promoting the penetration of the etherifying agent; catalyzing the etherification reaction with an alkylene oxide; and serving as a reactant for an alkyl halide. A portion of pulp not brought into contact with the aqueous alkali solution is not involved in the reaction and therefore remains as an undissolved portion. Lack of uniformity of the alkali cellulose directly leads to the undissolved portion.

To produce alkali cellulose, JP 2007-197682A describes a method comprising the steps of continuously bringing pulp chips into contact with an alkaline metal hydroxide solution having a concentration of 23 to 60% by weight to obtain a contact product, and draining the contact product with a continuous centrifugal separator.

SUMMARY OF THE INVENTION

In some cases, it is necessary to combine several types of pulps having different alkali metal hydroxide solution absorption rates and to use them as a raw material. For example, it is necessary to combine two or more brands of pulps to control a degree of polymerization of a final cellulose ether product. Different brands of pulps occasionally have different alkali metal hydroxide solution absorption rates. In addition, different lots of pulps also occasionally have different alkali metal hydroxide solution absorption rates even they are of the same brand. Because of the complexity of alteration in contact conditions, two or more different brands or different lots of pulps cannot be combined together. Accordingly, there have been cases that an yield is decreased or alkali cellulose having desired physical properties cannot be produced in a needed amount and at the required time. The invention provides a method for efficiently producing alkali cellulose having a uniform distribution of alkali.

The invention provides a method for producing alkali cellulose, comprising at least the steps of: bringing two or more types of pulps having different alkali metal hydroxide solution absorption rates into contact with an alkali metal hydroxide solution to obtain a contact product; and draining the contact product, wherein two or more types of pulps are combined such that the highest absorption rate is not more than 4.0 times as fast as the lowest absorption rate.

The invention also provides a method for producing cellulose ether, comprising at least a step of reacting the alkali cellulose produced according to the invention with an etherifying agent.

According to the invention, it has become possible to combine two or more different brands or different lots of pulps together so as to control a degree of polymerization of a final cellulose ether product. According to the invention, it has become possible to produce alkali cellulose having a uniform distribution of alkali efficiently so that cellulose ether having a high degree of etherification and high transparency can be produced efficiently.

BRIEF DESCRIPTION OF THE DRAWING

FIG. 1 shows an example of an apparatus for producing alkali cellulose.

DETAILED DESCRIPTION OF THE PREFERRED EMBODIMENTS

In the invention, two or more types of pulps having different alkali metal hydroxide solution absorption rates is brought into contact with an alkali metal hydroxide solution to obtain a contact product, and then the contact product is drained to produce alkali cellulose.

Examples of the pulp include wood pulp and cotton linter pulp. Examples of the wood include needle-leaf trees such as pine, spruce and hemlock, and broad-leaf trees such as eucalyptus and maple.

The pulp may be preferably in powder or chip form. The pulp in chip form is more preferable because a viscosity may decrease in a powderization step due to pulverization heat and the pulp in chip form is drained more easily in a draining step after being brought into contact with an alkali metal hydroxide solution.

The powdery pulp is available by pulverizing a pulp sheet and it is in powder form. Powdery pulp having an average particle size of from 10 to 1,000 μm is typically used, but powder pulp is not limited thereto. An average particle size may be determined according to sieve analysis. A method for preparing the powdery pulp is not limited. For example, a pulverizer such as a knife mill and a hammer mill can be used.

The method for preparing pulp chips is not limited. For example, they can be produced by cutting a pulp sheet with an existing cutting device such as a slitter cutter. The cutting device which can perform continuous cutting is advantageous in terms of investment cost.

The plane face area of the chip is preferably from 4 to 10,000 $mm^2$, more preferably 10 to 2,500 $mm^2$. Each chip having a plane face area smaller than 4 $mm^2$ may be difficult to be prepared. Each chip having a plane face area larger than 10,000 $mm^2$ may be difficult to be handled, for example, when it is introduced into a contactor, moved inside of the contactor and charged in a continuous centrifugal separator. The term "plane face area of pulp chip" as used herein means the largest face area of six face areas of the hexahedral chip, supposing that each pulp chip has a hexahedral shape.

Two or more types of pulps having different alkali metal hydroxide solution absorption rates may be separately brought into contact with an alkali metal hydroxide solution, but may be preferably mixed uniformly before they are brought into contact with the alkali metal hydroxide solution. For example, they can be mixed uniformly in a vessel equipped with a stirrer or in a fluidizing tank. Particularly preferred is a method of laminating and simultaneously cutting two or more sheets of pulps having different alkali metal hydroxide solution absorption rates. An existing cutting apparatus having a slit roll and a horizontal cutter is preferably used. The cutting apparatus that may continuously work is advantageous in terms of cost. Two or more sheets of pulps having different alkali metal hydroxide solution absorption rates are generally rolled. Accordingly, in a preferred method, rolls of pulp are held on a stand or stands that permit free rotating of the rolls, and the sheets rolled out therefrom are layered before the cutting apparatus and fed together to the cutting apparatus.

Two or more types of pulps having different alkali metal hydroxide solution absorption rates differ from each other in an alkali metal hydroxide solution absorption rate, and include pulps of different brands having different alkali metal hydroxide solution absorption rates and pulps of different lots of the same brand having different alkali metal hydroxide solution absorption rates.

An alkali metal hydroxide solution absorption rate can be measured according to the following method.

For example, a pulp sheet is cut with a cutter to form pulp chips. These chips are brought into contact with an alkali metal hydroxide solution for various periods of time at a constant temperature or for a constant period of time at various temperatures with the same contactor, drained under the same conditions to form alkali cellulose; and a ratio of alkali metal hydroxide in the alkali cellulose to a solid component in the pulp is determined by a titration method. A contact temperature at which and a contact time for which the pulp having the lowest rate of absorption among the pulps produces alkali cellulose having the ratio of 1.00 are selected. The other pulps are compared with the pulp having the lowest rate of absorption with respect to the ratio at the selected temperature for the selected time.

Two or more types of pulps having different alkali metal hydroxide solution absorption rates are preferably selected such that they are a pulp having the lowest absorption rate and the other pulp or pulps having absorption rates within the range of from more than 1.0 time to 4.0 times, preferably from more than 1.0 times to 2.0 times as fast as the slowest rate. When the pulp having the absorption rate of more than 4.0 times the slowest rate is combined, transparency of the cellulose ether produced later decreases. It is considered that a weight ratio of alkaline metal hydroxide in the alkali cellulose from the pulp having a lower absorption rate to a solid component in the pulp is too low, thereby resulting in cellulose ether having a portion substituted at a low degree. The portion decreases transparency of the cellulose ether. The pulp having more than 1.0 time the lowest absorption rate is combined because pulps having different alkali metal hydroxide solution absorption rates have to be combined as a raw material, for example, when two brands of pulps are combined to control a degree of polymerization of a final product.

When at least two types of pulps, which are of different brands or lots, are required to be combined in production of alkali cellulose, alkali metal hydroxide solution absorption rates of the pulps are measured beforehand, and a pulp having the lowest absorption rate and the other pulp or pulps having the absorption rates within the range of not more than 4.0 times as fast as the lowest rate.

Mixed pulps, which are preferably in chip form as a result of laminating and cutting two or more types of pulps having different alkali metal hydroxide solution absorption rates together, is preferably placed in a tank or the like, and then preferably fed to a contactor for being brought into contact with an alkali metal hydroxide solution.

According to the invention, the contactor for bringing the pulps into contact with an alkali metal hydroxide solution may be of a batch type or a continuous type. From the viewpoint of cost, a continuous type is preferred. Preferred is the contactor which can adjust a period of time from the start of bringing the pulps into contact with an alkali metal hydroxide solution by the complete immersion of the pulps in the solution to the end of subsequent draining with a centrifugal separator and has narrow variations in the period of time such as something close to a piston flow. Examples of the contactor include those of a pipe type, a bucket conveyer type, a screw conveyer type, a belt conveyer type, and a rotary feeder type.

A contact mixture may be optionally made into porridge form by applying an adequate stirring or shearing force.

According to the invention, when a 23 to 60% by weight alkali metal hydroxide solution is used, a ratio of a total weight of pulps to a volume of the solution per unit time is preferably not more than 0.15 kg/L, more preferably not more than 0.10 kg/L, even more preferably not more than 0.05 kg/L. When the ratio is higher than 0.15 kg/L, compete immersion of the pulps in the solution may become difficult so that an alkali distribution in alkali cellulose may not be uniform and a product may have a decreased quality. The lower limit of the ratio may be preferably 0.0001 kg/L. When the ratio is less than 0.0001 kg/L, a large scale of facility, which is impractical, may be required.

According to the invention, preferred is the contactor for bringing pulps into contact with an alkali metal hydroxide solution which can optionally control a contact time or a temperature of the solution. A composition of alkali cellulose depends on an amount of the alkali metal hydroxide solution absorbed by the pulp, and the amount absorbed may be controlled by controlling a contact time and a temperature of the solution. Accordingly, alkali cellulose having a desired composition can be produced by controlling the contact time or the temperature of the solution.

A temperature of an alkali metal hydroxide solution may be adjusted by a known technique, preferably with a heat exchanger. The heat exchanger may be installed inside or outside the contactor. The temperature of an alkali metal hydroxide solution is not particularly limited. It is preferably adjusted within the range of 15 to 80° C. The contactor is preferably adapted for a continuous process with respect to the size because the main body of the continuous contactor can be made advantageously smaller than that of a batch type contactor.

According to the invention, a method for adjusting a contact time includes varying a length of a contact zone, varying a rotation number of a screw conveyer type contactor or a rotary feeder type contactor, and varying a flow rate of a liquid of a pipe type contactor. The contact time may be preferably 1 second to 15 minutes, more preferably 2 seconds to 2 minutes. When the contact time is shorter than 1 second, the contact time may be very difficult to be controlled. When the contact time is longer than 15 minutes, a large scale of facility may be required, or productivity may be lowered. In addition, an amount of alkali absorption by pulps increases excessively so that it may become difficult to produce alkali cellulose having a desired composition for production of cellulose ether, no matter what drainer will be used.

The contactor for bringing pulps into contact with an alkali metal hydroxide solution may be of a batch type or a continuous type. Preferred is a continuous type. A continuous type contactor may advantageously have smaller main body than that of a batch type so that space is saved. The continuous type contactor preferably passes pulps like a piston flow because a composition of alkali cellulose depends on a contact time as described above and a small variation of the contact time preferably results in a uniform composition of alkali cellulose for better quality. It is necessary to avoid supplied pulps passing without being brought into contact with alkali for better quality. Particularly considering that pulps tend to float on an alkaline metal hydroxide solution, the pulps are preferably passed so as to be completely brought into contact with an alkaline metal hydroxide solution in a contactor.

Pulps and an alkali metal hydroxide solution are preferably fed into a contactor in this order, or pre-mixed and fed into the apparatus. When the pulps and the solution are pre-mixed, since they have been already contacted before being fed, this contact time is preferably controlled.

To prevent a degree of polymerization of alkali cellulose from decreasing in the to the presence of oxygen, the contactor for bringing pulps into contact with an alkali metal hydroxide solution may be preferably evacuated or substituted with nitrogen. If controlling a degree of polymerization in the presence of oxygen is intended, the contactor preferably has a mechanism that can control an amount of oxygen.

Any alkaline metal hydroxide solution may be used insofar as it provides alkali cellulose. An aqueous solution of sodium hydroxide or potassium hydroxide is preferable, and an aqueous sodium hydroxide solution is more preferable in consideration of cost. The alkaline metal hydroxide solution preferably has a concentration of 23 to 60% by weight, more preferably 35 to 55% by weight. When the concentration is less than 23% by weight, in the next step of producing cellulose ether, an etherifying agent causes an undesirable side reaction with water in consideration of cost, or transparency of an aqueous solution of cellulose ether produced may be poor because of the cellulose ether not having an intended substitution degree. When the concentration is more than 60%, the solution has high viscosity so that it may be difficult to be handled.

The concentration of an alkaline metal hydroxide solution to be brought into contact with pulps is preferably kept constant in order to stabilize a composition of alkali cellulose and ensure transparency of cellulose ether.

According to the invention, a lower alcohol (preferably an alcohol having 1 to 4 carbon atoms) and the other inert solvent may be used. Use of such a solvent may improve uniformity of alkali distribution in alkali cellulose and bulk density of alkali cellulose.

The drainer may be of a batch type or a continuous type. From the viewpoint of productivity, the continuous type drainer is preferable. Examples of the continuous drainer include a drainer employing centrifugal force such as a decanter and a rotary basket, a mechanical drainer such as a roll type drainer, a V-shaped disk press and a bucket press, and a vacuum filter. From the point of uniform draining, preferred is a drainer employing centrifugal force. Examples of the drainer include a centrifugal drainer of a screw ejection type, a centrifugal drainer of an extrusion plate type and a decanter. The drainer employing centrifugal force can adjust a rotation number according to a degree of draining needed. Similarly, the mechanical drainer can adjust a draining pressure, and the vacuum filter can adjust a degree of vacuum.

FIG. 1 shows an example of an apparatus for producing alkali cellulose 3, comprising a contactor 10 for bringing pulps 1 into contact with an alkali metal hydroxide solution 2 to produce a contact product, a centrifugal separator 20 for separating the contact product into alkali cellulose and a solution containing alkali metal hydroxide, a concentrator 35 for concentrating a part or all of the separated solution containing alkali metal hydroxide, and a tank 30 for mixing the solution containing alkali metal hydroxide separated in the centrifugal separator 20 and/or concentrated by the concentrator 35 with an alkali metal hydroxide solution. From rolls of pulps 1 (pulp 1a and pulp 1b are shown), pulp sheets are rolled out and layered to be fed together into a cutter 40. The sheets are cut into pulp chips. Pulp chips are placed in a pulp chip tank 41 and fed into the contactor 10 therefrom. A solution mixed in the tank 30 is sent to the contactor 10 and recycled for contact of pulp. In FIG. 1, a solution containing alkali metal hydroxide separated in the centrifugal separator 20 is sent to the concentrator 35 by using a pump 31, and a solution containing, alkali metal hydroxide in the tank 30 is sent to the contactor 10 by using the pump 31.

A weight ratio of alkali metal hydroxide contained by a cake (alkali cellulose) formed by a drainer to solid components in pulps (alkali metal hydroxide/solid component in pulp) is preferably 0.3 to 1.5, more preferably 0.65 to 1.30, still more preferably 0.90 to 1.30. Alkali cellulose having the weight ratio within the range of from 0.3 to 1.5 may produce cellulose ether having high transparency. The solid component in the pulp may include, in addition to main component of cellulose, organic matter such as hemicelluloses, lignin and resins, and inorganic matter such as Si and Fe.

The weight ratio of alkaline metal hydroxide to a solid component in the pulp may be determined, for example, when sodium hydroxide is used, by the following titration method.

First, 4.00 g of a cake is collected and the amount (% by weight: wt %) of the alkali metal hydroxide contained in the cake is determined by neutralization titration (0.5 mol/L $H_2SO_4$, indicator: phenolphthalein). A blank test is also performed in the same manner.

wt % of alkali metal hydroxide=(normality factor)×{(dropped amount (ml) of $H_2SO_4$)−(dropped amount (ml) of $H_2SO_4$ in blank test)}

Using the wt % of the alkali metal hydroxide contained in the cake, (alkali metal hydroxide)/(solid components in pulp) is then determined in accordance with the following equation:

(wt of alkali metal hydroxide)/(wt of solid component in pulp)=(wt % of alkali metal hydroxide)/[{100−(wt % of alkali metal hydroxide)/(B/100)}×(S/100)]

In the above equation, B represents the concentration (wt %) of the alkali metal hydroxide solution and "S" represents the concentration (wt %) of the solid component in the pulp. The concentration of the solid component in the pulp is obtained by dividing the dry weight after drying about 2 g of the pulp at 105° C. for 2 hours by the weight of the pulp and then expressing the quotient by wt %.

According to the invention, a composition of alkali cellulose currently produced may be determined by measuring a feed rate of pulps to a contactor, and a collecting rate of alkali cellulose after draining or a consumption rate of an alkali metal hydroxide solution, and calculating a weight ratio of the pulps and the alkali metal hydroxide. The composition of alkali cellulose currently produced can be adjusted to an intended composition by controlling a contact time, a temperature of an alkali metal hydroxide solution in the contactor, and a draining pressure. Operations of measuring, calculating and controlling can be automated.

A composition of alkali cellulose can be determined from a degree of etherification, that is, a molar substitution of cellulose ether produced from the alkali cellulose.

Using the alkali cellulose obtained by the above-described preparation method as a raw material, cellulose ether can be prepared in a known manner.

The reaction method may include a batch process and a continuous process. The continuous reaction process is preferable because a continuous process is preferably employed for preparation of the alkali cellulose in the invention, but the batch process is also usable.

In the batch process, the alkali cellulose discharged from the drainer may be stored in a buffer tank, or placed directly in an etherification reactor. It is preferable from the standpoint of higher productivity to store the alkali cellulose in the buffer tank and then place it in a reaction vessel within a short time, thereby reducing the occupancy time in the etherification reactor. For suppressing decrease in the degree of polymerization, the buffer tank preferably has an oxygen-free atmosphere by vacuum or nitrogen replacement.

Examples of cellulose ether obtainable from the resulting alkali cellulose as a starting material include alkyl cellulose, hydroxyalkyl cellulose, hydroxyalkylalkyl cellulose and carboxymethyl cellulose.

Examples of the alkyl cellulose include methyl cellulose having a methoxy group (DS) of from 1.0 to 2.2 and ethyl cellulose having an ethoxy group (DS) of from 2.0 to 2.6. It should be noted that DS represents the degree of substitution and means the average number of hydroxyl groups replaced by a methoxy group per glucose ring unit of cellulose, while MS represents molar substitution and means the average mole of hydroxypropoxy group or hydroxyethoxy group added per glucose ring unit of cellulose.

Examples of the hydroxyalkyl cellulose may include hydroxyethyl cellulose having a hydroxyethoxy group (MS) of from 0.05 to 3.0 and hydroxypropyl cellulose having a hydroxypropoxy group (MS) of from 0.05 to 3.3.

Examples of the hydroxyalkylalkyl cellulose may include hydroxyethylmethyl cellulose having a methoxy group (DS) of from 1.0 to 2.2 and a hydroxyethoxy group (MS) of from 0.1 to 0.6, hydroxypropylmethyl cellulose having a methoxy group (DS) of from 1.0 to 22 and a hydroxypropoxy group (MS) of from 0.1 to 0.6, and hydroxyethylethyl cellulose having an ethoxy group (DS) of from 1.0 to 2.2 and a hydroxyethoxy group (MS) of from 0.1 to 0.6.

Examples further include carboxymethyl cellulose having a carboxymethoxy group (DS) of from 0.2 to 2.0.

Examples of the etherifying agent may include alkyl halides such as methyl chloride and ethyl chloride; alkylene oxides such as ethylene oxide and propylene oxide; and monochloroacetic acid.

EXAMPLES

The present invention will be described with reference to Examples and Comparative Examples, but should not be limited thereto.

<Measurement of an Aqueous Sodium Hydroxide Solution Absorption Rate of Pulp>

Pulps A and B, each having solid content of 93% by weight, were subjected to treatment with a cutting machine comprising a slitting cutter and a horizontal blade to produce 10 mm-square pulp chips A and B, respectively.

A screw-conveyer type immersion tank comprising a screw conveyer having a screw diameter of 154 mm, a shaft diameter of 90 mm, a screw length of 1,500 mm and a screw pitch of 100 mm was provided and the screw conveyor was rotated at 30 rpm. Pulp chips A were fed into the screw-conveyer type immersion tank at a rate of 50 kg/hour. At the same time, an aqueous 49% by weight sodium hydroxide solution at 40° C. was fed into the tank at a rate of 1,700 L/hour from an inlet for sodium hydroxide. A centrifugal dehydrator of an extrusion plate type having a 0.2 mm slit screen, which was a continuous centrifugal separator, was installed at the end of the screw-conveyer type immersion tank. The centrifugal dehydrator continuously drained at a centrifugal effect of 1,000 a contact mixture between the pulp chips and the aqueous sodium hydroxide solution, the contact mixture having been discharged from the screw-conveyer type immersion tank. A weight ratio of the alkaline metal hydroxide in the obtained alkali cellulose to a solid component in the pulp was determined by the titration method and found to be 1.00.

Next, pulp chips B were processed in the same way. A weight ratio of the alkaline metal hydroxide in the obtained alkali cellulose to a solid component in the pulp was found to be 1.20.

Consequently, a ratio of an aqueous sodium hydroxide solution absorption rate of pulp B to that of pulp A (pulp B/pulp A) was 1.20/1.00=1.20.

Example 1

Sheets of pulp A and pulp B were layered and processed together with a cutting machine to produce 10 mm-square mixed pulp chips AB.

A screw-conveyer type immersion tank comprising a screw conveyer having a screw diameter of 154 mm, a shaft diameter of 90 mm, a screw length of 1,500 mm and a screw pitch of 100 mm was provided and the screw conveyer was rotated at 25 rpm. The mixed pulp chips AB were fed into the screw-conveyer type immersion tank at a rate of 50 kg/hour. At the same time, an aqueous 49% by weight sodium hydroxide solution at 30° C. was fed into the tank at a rate of 1,700 L/hour from an inlet for sodium hydroxide. A centrifugal dehydrator of an extrusion plate type having a 0.2 mm slit screen, which was a continuous centrifugal separator, was installed at the end of the screw-conveyer type immersion tank. The centrifugal dehydrator continuously drained at a centrifugal effect of 1,000 a contact mixture between the mixed pulp chips and the aqueous sodium hydroxide solution, the contact mixture having been discharged from the screw-conveyer type immersion tank. A weight ratio of the alkaline metal hydroxide in the obtained alkali cellulose to solid components in the pulps was determined by the titration method and found to be 1.25.

An amount of the obtained alkali cellulose, which corresponded to 5.5 kg of cellulose, was placed in a pressure-resistant vessel. After vacuuming, 11 kg of methyl chloride and 2.7 kg of propylene oxide were added thereto and reacted. The product was washed, dried and pulverized to produce hydroxypropylmethyl cellulose. A degree of substitution of the obtained cellulose ether, and viscosity and transmittance of an aqueous 2% by weight solution thereof at 20° C. are shown in Table 1. The transmittance was measured with a photoelectric colorimeter PC-50 using a cell length of 20 mm and a wavelength of 720 nm.

Example 2

Pulp C and pulp D were used as raw materials. A ratio of an aqueous sodium hydroxide solution absorption rate of pulp D to that of pulp C (pulp D/pulp C) was 2.00.

Sheets of pulp C and pulp D were layered and processed together with a cutting machine to produce 10 mm-square mixed pulp chips CD.

A pipe having an inner diameter of 38 mm and a length of 10 m was provided and connected to a snake pump equipped with a hopper (Heishin Pump Works Co., Ltd., model NVL40PL) at the inlet of the pipe. An aqueous 49% by weight solution of sodium hydroxide at 40° C. was fed into the hopper at a rate of 1,100 L/hour. At the same time, the mixed pulp chips CD were fed at a rate of 50 kg/hour. The pipe was connected to a V-shaped disk press at the end of the pipe. The V-shaped disk press continuously drained a contact mixture between the mixed pulp chips and the aqueous sodium hydroxide solution, the contact mixture having been discharged from the pipe. A weight ratio of the alkaline metal hydroxide in the obtained alkali cellulose to solid components in the pulps was determined by the titration method and found to be 1.25.

An amount of the obtained alkali cellulose, which corresponded to 5.5 kg of cellulose, was placed in a pressure-resistant vessel. After vacuuming, 11 kg of methyl chloride and 2.7 kg of propylene oxide were added thereto and reacted. The product was washed, dried and pulverized to produce hydroxypropylmethyl cellulose. The obtained cellulose ether was subjected to measurement of physical properties in the same manner as in Example 1. Results are shown in Table 1. The transmittance of an aqueous 2% by weight solution of the obtained hydroxypropylmethyl cellulose at 20° C. was measured with a photoelectric colorimeter PC-50 using a cell length of 20 mm and a wavelength of 720 nm.

Example 3

Pulp E and pulp F were used as raw materials. A ratio of an aqueous sodium hydroxide solution absorption rate of pulp F to that of pulp E (pulp F/pulp E) was 4.00.

Sheets of pulp E and pulp F were layered and processed together with a cutting machine to produce 10 mm-square mixed pulp chips EF.

A screw-conveyer type immersion tank comprising a screw conveyer having a screw diameter of 154 mm, a shaft diameter of 90 mm, a screw length of 1,500 mm and a screw pitch of 100 mm was provided and the screw conveyer was rotated at 30 rpm. The mixed pulp chips EF were fed into the screw-conveyer type immersion tank at a rate of 50 kg/hour. At the same time, an aqueous 49% by weight sodium hydroxide solution at 20° C. was fed into the tank at a rate of 1,700 L/hour from an inlet for sodium hydroxide. A centrifugal dehydrator of a screw discharge type having a 0.2 mm slit screen, which was a continuous centrifugal separator, was installed at the end of the screw-conveyer type immersion tank. The centrifugal dehydrator continuously drained at a centrifugal effect of 1,000 a contact mixture between the mixed pulp chips and the aqueous sodium hydroxide solution, the contact mixture having been discharged from the screw-conveyer type immersion tank. A weight ratio of the alkaline metal hydroxide in the obtained alkali cellulose to solid components in the pulps was determined by the titration method and found to be 1.25.

An amount of the obtained alkali cellulose, which corresponded to 5.5 kg of cellulose, was placed in a pressure-resistant vessel. After vacuuming, 11 kg of methyl chloride and 2.7 kg of propylene oxide were added thereto and reacted. The product was washed, dried and pulverized to produce hydroxypropylmethyl cellulose. The obtained cellulose ether was subjected to measurement of physical properties in the same manner as in Example 1. Results are shown in Table 1. The transmittance of an aqueous 2% by weight solution of the obtained hydroxypropylmethyl cellulose at 20° C. was measured with a photoelectric colorimeter PC-50 using a cell length of 20 mm and a wavelength of 720 nm.

Comparative Example 1

Cellulose ether was prepared in the same manner as in Example 1 except that pulp G and pulp H were used as starting materials and a ratio of an aqueous sodium hydroxide solution absorption rate of pulp H to that of pulp G (pulp H/pulp G) was 4.20. Results are shown in Table 1.

TABLE 1

| | ratios of aqueous sodium hydroxide solution absorption rates | cellulose ether | | aqueous 2% by weight cellulose ether solution | |
|---|---|---|---|---|---|
| | | methoxy group (DS) | hydroxy- propoxy group (MS) | 20° C. viscosity (mPa · s) | 20° C. transmittance (%) |
| Example 1 | 1.20 | 1.90 | 0.24 | 10000 | 98.5 |
| Example 2 | 2.00 | 1.90 | 0.24 | 11000 | 97.0 |
| Example 3 | 4.00 | 1.90 | 0.24 | 9900 | 95.0 |
| Comp. Ex. 1 | 4.20 | 1.90 | 0.24 | 9600 | 92.0 |

As shown in Table 1, Examples 1 to 3 using combinations of pulps in which the higher absorption rates are 1.20 limes, 2.00 times and 4.00 times as fast as the lowest absorption rates, respectively, resulted in cellulose ethers having higher transparency and viscosity than that of the final product of Comparative Example 1 using a combination of pulps in which the higher absorption rate is more than 4.0 times the lowest absorption rate.

The invention claimed is:

1. A method for producing cellulose ether, comprising at least the steps of:
   bringing two or more types of pulps having different alkali metal hydroxide solution absorption rates into contact with a 23 to 60% by weight alkali metal hydroxide solution to obtain a contact product; and
   draining the contact product to obtain alkali cellulose; and
   reacting the alkali cellulose with an etherifying agent;
   wherein the alkali metal hydroxide solution absorption rates of the two or more types of pulps are measured before the step of bringing two or more types of pulps into contact with the alkali metal hydroxide solution, and the two or more types of pulps are combined so that the highest absorption rate is not more than 4.0 times as fast as the lowest absorption rate.

2. The method for producing cellulose ether according to claim 1, wherein the pulps are in chip form, and the method further comprises the steps of layering two or more sheets of pulps having the different alkali metal hydroxide solution absorption rates and cutting them together to form the pulps in chip form before the step of bringing two or more types of pulps into contact with an alkali metal hydroxide solution.

* * * * *